(12) United States Patent
Moberg

(10) Patent No.: US 9,371,053 B2
(45) Date of Patent: Jun. 21, 2016

(54) PACKAGE CONFIRMATION QUALITY CHECK TOOL FOR AN AIRBAG SYSTEM AND METHOD OF OPERATION THEREOF

(71) Applicant: Toyota Motor Engineering & Manufacturing North America, Inc., Erlanger, KY (US)

(72) Inventor: Joshua L. Moberg, Milan, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 5 days.

(21) Appl. No.: 14/485,032

(22) Filed: Sep. 12, 2014

(65) Prior Publication Data

US 2016/0075302 A1 Mar. 17, 2016

(51) Int. Cl.
*B60R 21/16* (2006.01)
*B60R 21/237* (2006.01)

(52) U.S. Cl.
CPC .................................... *B60R 21/237* (2013.01)

(58) Field of Classification Search
USPC ........................................... 280/743.1, 743.2
See application file for complete search history.

(56) References Cited

U.S. PATENT DOCUMENTS

| | | | | |
|---|---|---|---|---|
| 4,585,123 A * | 4/1986 | Penry | ..................... | G11B 33/10 206/387.1 |
| 6,386,584 B1 * | 5/2002 | Bowser | ................. | B60R 21/237 280/743.1 |
| 6,902,187 B2 * | 6/2005 | Sonnenberg | .......... | B60R 21/201 280/730.2 |
| 7,163,231 B2 | 1/2007 | Kumagai | | |
| 7,478,826 B2 * | 1/2009 | Soderquist | .............. | B60R 21/20 280/728.2 |
| 8,056,924 B2 | 11/2011 | Hatfield et al. | | |
| 8,157,290 B2 | 4/2012 | Kjell et al. | | |
| 2003/0184057 A1 * | 10/2003 | Kumagai | .............. | B60R 21/213 280/728.3 |
| 2004/0000775 A1 * | 1/2004 | Henderson | ............ | B60R 21/213 280/730.2 |
| 2005/0029778 A1 * | 2/2005 | Weber | ................... | B60R 21/213 280/728.2 |
| 2006/0192368 A1 * | 8/2006 | Hall | ....................... | B60R 21/213 280/730.2 |
| 2007/0090630 A1 * | 4/2007 | Wilmot | ................. | B60R 21/201 280/728.2 |
| 2008/0217896 A1 * | 9/2008 | Visker | ..................... | B60R 21/20 280/743.1 |
| 2008/0224457 A1 * | 9/2008 | Brough | ................. | B60R 21/232 280/730.2 |
| 2011/0042923 A1 * | 2/2011 | Hatfield | ................ | B60R 21/201 280/730.2 |

FOREIGN PATENT DOCUMENTS

| | | |
|---|---|---|
| CN | 103389721 | 11/2013 |
| JP | H11321532 A | 11/1999 |
| JP | 2004098707 A | 4/2004 |
| JP | 2004224255 A | 8/2004 |
| JP | 2009154656 A | 7/2009 |
| JP | 2011251588 A | 12/2011 |

* cited by examiner

*Primary Examiner* — Toan To
(74) *Attorney, Agent, or Firm* — Christopher G. Darrow; Darrow Mustafa PC

(57) ABSTRACT

An airbag system includes an inflatable airbag including an aperture and an indicator, the indicator viewable through the aperture when the inflatable airbag is in a packaged condition. A method of packaging an inflatable airbag includes rolling an inflatable airbag into a packaged configuration and confirming the indicator is visible through the aperture when the inflatable airbag is in the packaged condition.

20 Claims, 4 Drawing Sheets

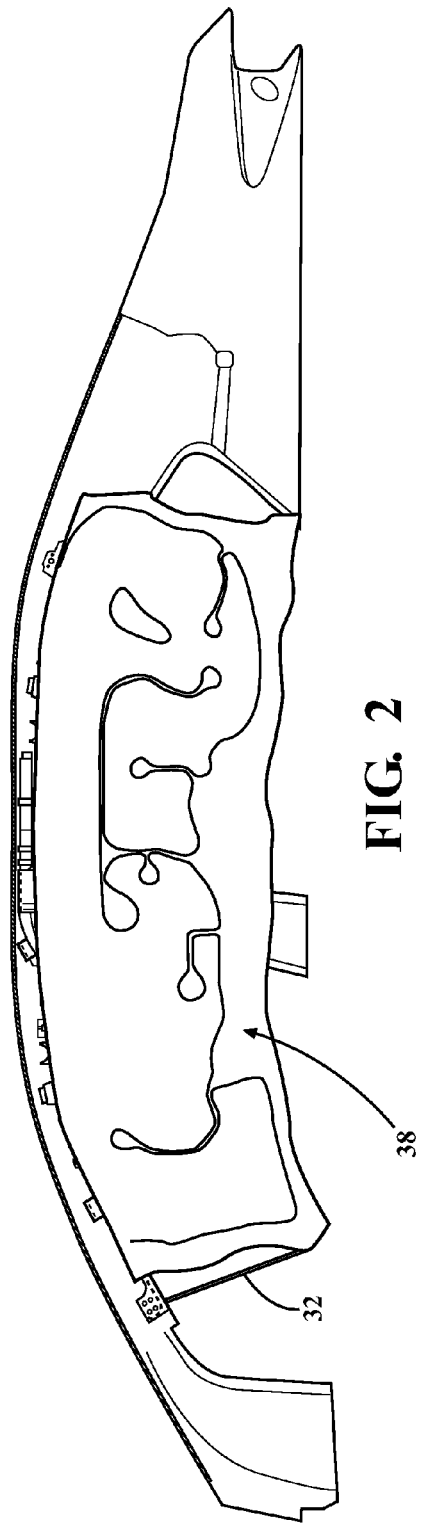
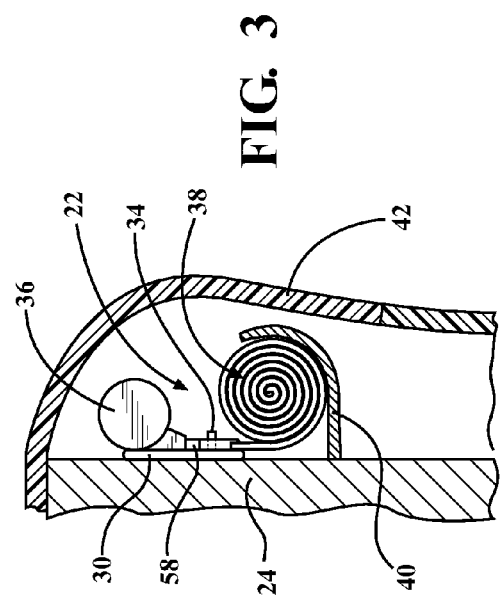

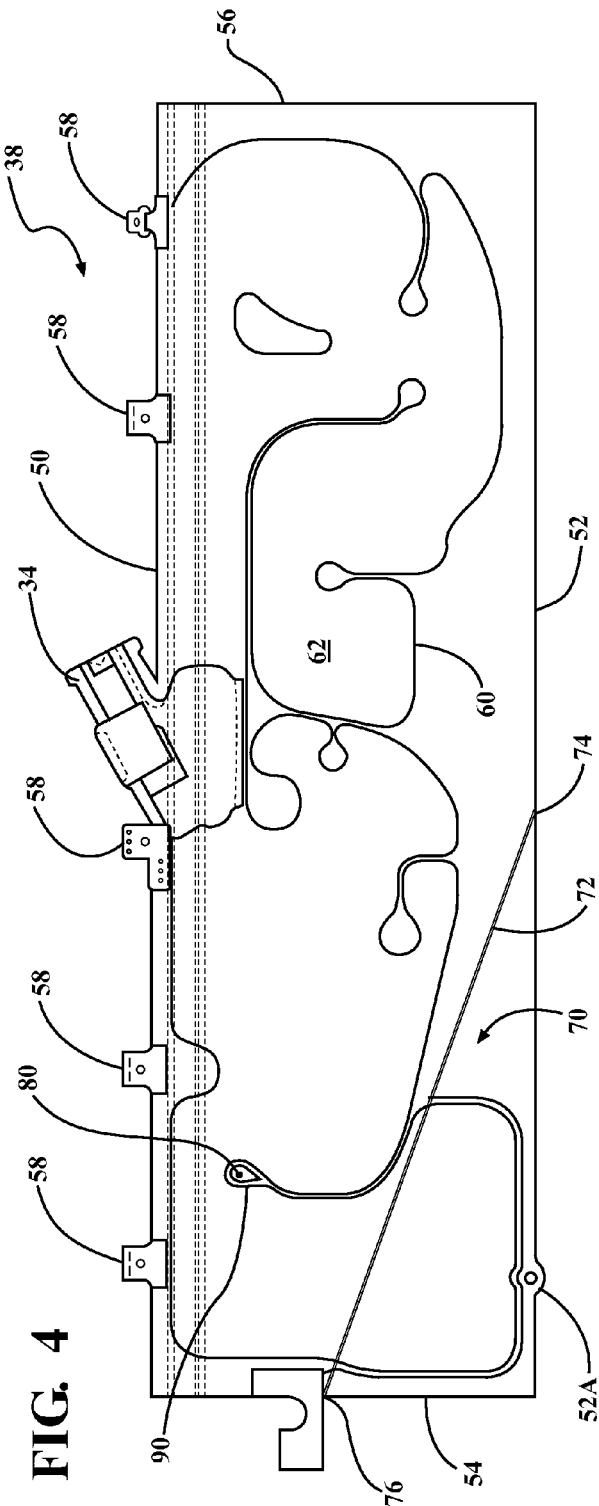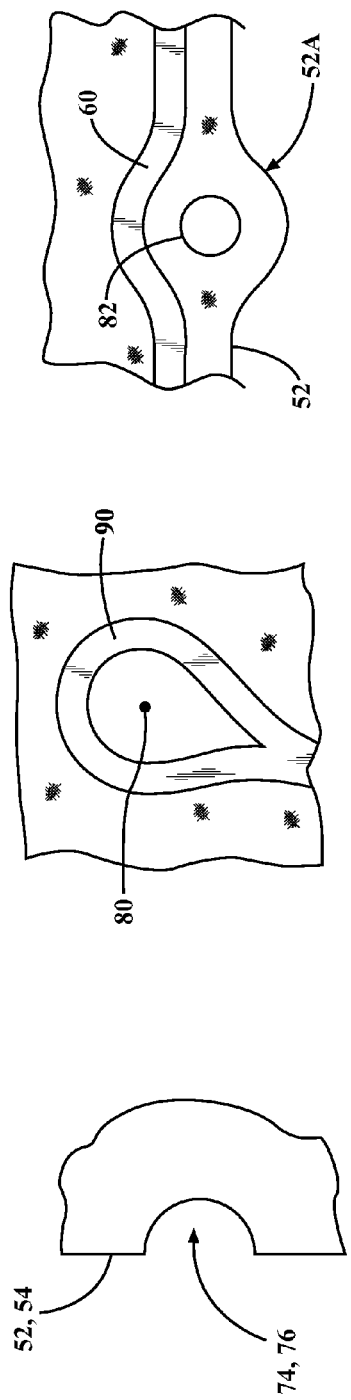

PACKAGE CONFIRMATION QUALITY CHECK TOOL FOR AN AIRBAG SYSTEM AND METHOD OF OPERATION THEREOF

BACKGROUND

The present disclosure relates generally to an airbag system and, more particularly, to a package confirmation quality check tool that is viewable to confirm proper packaging of a curtain shield airbag system for a vehicle.

Airbag modules have become common in many vehicles. An airbag module typically includes an inflatable airbag and an inflator within a housing. The airbag module is installed in a desired position within the vehicle, such as in a steering wheel, dashboard, seat, vehicle door, pillar, roof rail, or other location. In response to an activation event, a sensor activates the inflator to generate an inflation gas that rapidly inflates the inflatable airbag to facilitate protection of an occupant.

Inflatable curtain shield airbags typically extend longitudinally within the vehicle and usually deploy from a roof rail. In a deployed condition, the inflatable curtain shield airbag typically covers at least a portion of the vehicle side windows and one or more pillars of the vehicle.

To ensure effective deployment, the airbag must be accurately packaged. As such, various and multiple quality control measures, such as measuring the rolled airbag in the packaged configuration, are performed. Although effective, such procedures are relatively laborious and time consuming.

SUMMARY

An airbag system described herein includes a curtain shield airbag with an indicator and an associated aperture that together form a package confirmation quality check tool. The package confirmation quality check tool allows the indicator to be visible through the aperture when the curtain shield airbag is properly packaged. The visual confirmation efficiently effectuates quality packaging by an operator during the packaging process.

An airbag system, according to one disclosed non-limiting embodiment includes an inflatable airbag including an aperture and an indicator, the indicator viewable through the aperture when the inflatable airbag is in a packaged condition.

A method of packaging an inflatable airbag, including an indicator and an aperture, according to another disclosed non-limiting embodiment includes rolling an inflatable airbag into a packaged configuration and confirming the indicator is visible through the aperture when the inflatable airbag is in the packaged condition.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 2 is a schematic view of a vehicle occupant compartment with a curtain shield airbag in a deployed condition;

FIG. 3 is a sectional view of the curtain shield airbag;

FIG. 4 is a plan view of the curtain shield airbag with a package confirmation quality check tool according to one disclosed non-limiting embodiment;

FIG. 5 is an expanded view of a fold notch in the curtain shield airbag of FIG. 4;

FIG. 6 is an expanded view of an indicator of the package confirmation quality check tool of FIG. 4;

FIG. 7 is an expanded view of an aperture of the package confirmation quality check tool of FIG. 4;

DETAILED DESCRIPTION

An airbag system and a method that provides visual confirmation of proper packaging of a curtain shield airbag are disclosed. The airbag system includes an indicator and an associated aperture that together form a package confirmation quality check tool. The package confirmation quality check tool allows the indicator to be visible through the aperture when the curtain shield airbag is properly folded and rolled. The indicator may be a woven dot that is visible through a circular aperture to ensure a desired tolerance.

Figure 1:
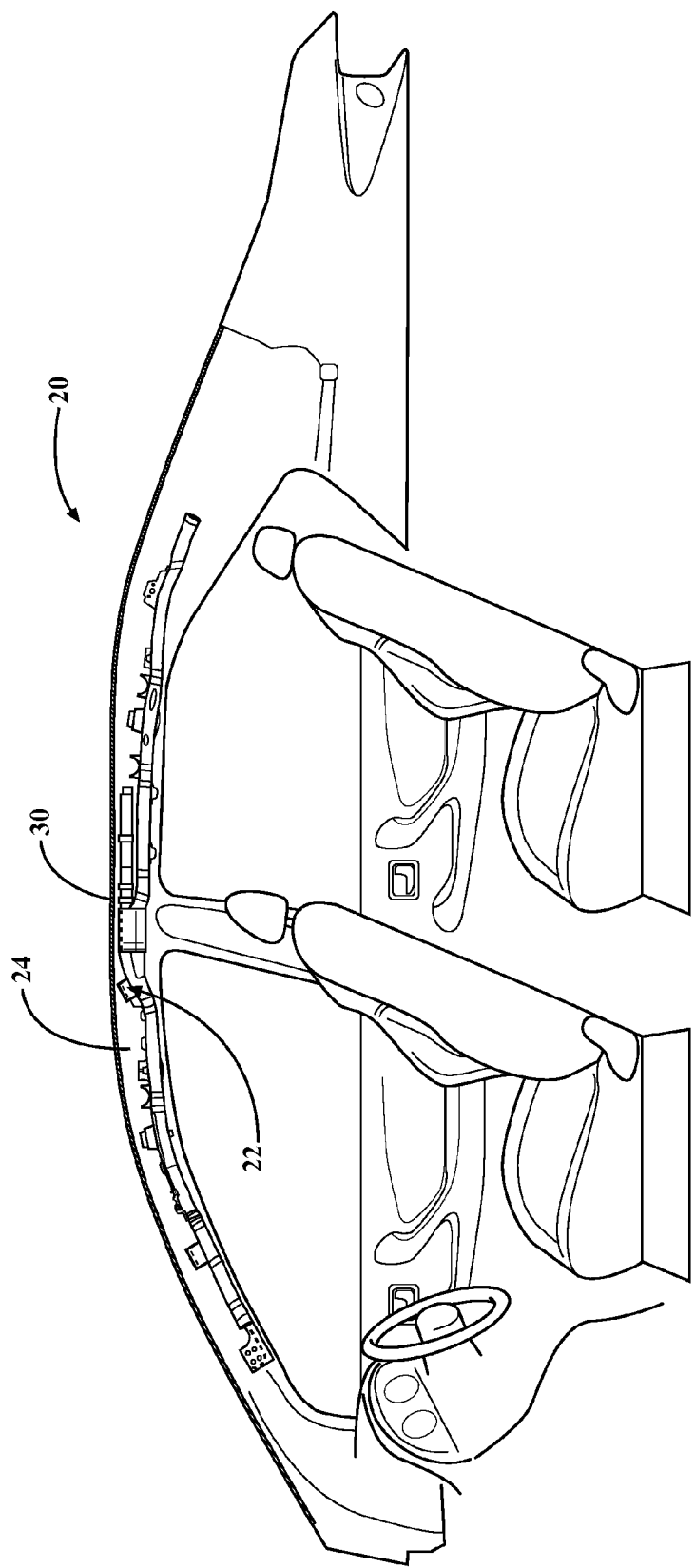
FIG. 1 is a schematic view of a vehicle occupant compartment with a curtain shield airbag in a packaged condition.

FIG. 1 schematically illustrates selected portions of a vehicle 20 with a curtain shield airbag system 22 shown in a packaged configuration. The curtain shield airbag system 22 is typically mounted along a vehicle roof rail 24 and generally includes an airbag mount assembly 30, and as shown in FIGS. 2 and 3, a multiple of tethers 32, a fill tube 34, an inflator 36, and a curtain shield airbag 38. It should be appreciated that although particular systems are separately defined, each, or any, of the systems may be otherwise combined or segregated.

With reference to the section view of FIG. 3, the curtain shield airbag system 22 is coupled along the vehicle roof rail 24 though the mount assembly 30. The mount assembly 30 stores the curtain shield airbag 38 in the packaged configuration and typically includes a trough 40 and one or more trim panels 42. The trough 40 may be manufactured of a resilient material such as rubber or other protective material that at least partially supports and protects the curtain shield airbag 38 along the vehicle roof rail 24. The one or more trim panels 42 may include interior trim or other aesthetic features such as a vehicle headliner that conceals the curtain shield airbag 38.

The curtain shield airbag 38 is configured to become inflated upon activation of one or more inflators 36 through the fill tube 34 and is partially retained, as shown in FIG. 2, by the tethers 32 such that the inflatable curtain shield airbag 38 transitions from the packaged configuration within the mount assembly 30 to the deployed configuration. The inflator 36 may be one of several types, such as pyrotechnic, stored gas, or a combination inflator and may comprise a single or multistage inflator. As the curtain shield airbag 38 becomes inflated, the mount assembly 30 ceases to retain and conceal the curtain shield airbag 38 such that the curtain shield airbag 38 extends from the packaged configuration to the deployed configuration.

With reference to FIG. 4, the curtain shield airbag 38 is generally rectilinear with an upper edge 50, a lower edge 52, and side edges 54, 56. The curtain shield airbag 38 may be manufactured of a fabric material such as nylon or polyester. The upper edge 50 may include a multiple of tabs 58 that facilitate attachment of the curtain shield airbag 38 to the vehicle roof rail 24. It should be appreciated that various attachments to the vehicle 20 may be alternatively or additionally provided.

The curtain shield airbag 38 includes a boundary 60 that bounds an inflatable area 62. That is, the boundary 60 attaches the layers of the curtain shield airbag 38 to form the inflatable area 62 such that the area outside of the boundary 60 does not inflate. A stitch, seal, or other demarcation around a periphery of the inflatable area 62 defines the boundary 60. The inflatable area 62 is thereby formed within the boundary 60 to receive the relatively high pressures as well as maintain such pressures formed by the inflation gas.

To package the curtain shield airbag 38 into the packaged configuration, a corner 70 of the curtain shield airbag 38 may first be folded along a fold line 72 prior to rolling the curtain shield airbag 38 into the final packaged configuration. The curtain shield airbag 38 may first be folded along the fold line 72 to, for example, facilitate a desired deployment to achieve various vehicle safety performance targets. The fold line 72 may be defined by notches 74, 76 in the lower edge 52, and the side edge 54, respectively. The notches 74, 76 (FIG. 5) provide an index for an operator to accurately fold the corner 70.

Figure 8:
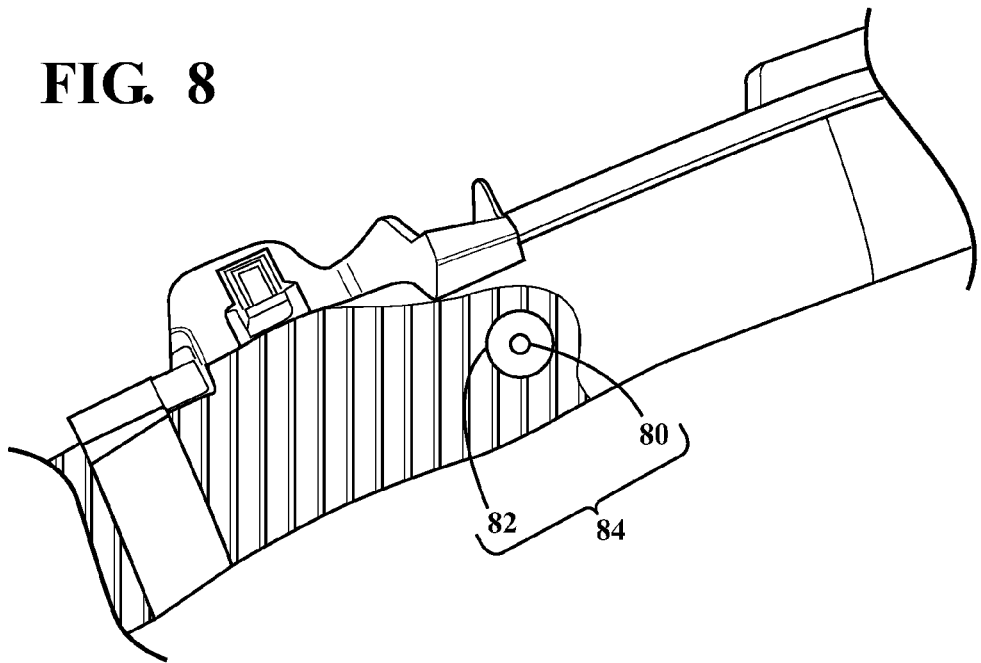
FIG. 8 is a view of the package confirmation quality check tool in one disclosed non-limiting embodiment.

To confirm an accurate fold and roll in the packaged configuration, the curtain shield airbag 38 further includes an indicator 80 (FIG. 6), and an associated aperture 82 (FIG. 7) that together form a package confirmation quality check tool 84 (FIG. 8). The indicator 80 may be formed, for example, from stitching or thread that is of a contrasting color to that of the material from which the curtain shield airbag 38 is manufactured. That is, the indicator 80 may be of a material and/or color different from that which forms the boundary 60.

In one example, curtain shield airbag 38, the indicator 80 is located outside of the boundary 60 and within an eyelet feature 90 (FIG. 6). That is, the indicator 80 is located in a no-tack area formed where the boundary 60 essentially turns back upon itself. In this example, the indicator 80 is located outside of the corner 70. The aperture 82 is located along the lower edge 52 outside the boundary 60 in a tab area 52A (FIG. 7). The tab area 52A may provide equal spacing around the aperture 82 as defined by the boundary 60 and the lower edge 52.

With reference to FIG. 8, in one disclosed non-limiting embodiment, the indicator 80 is a woven dot that is visible through the aperture 82 when the curtain shield airbag 38 is properly folded and rolled. In this embodiment, the indicator 80 is about 2 mm in diameter and the aperture 82 is about 20 mm in diameter. It should be appreciated that various sizes that provide for various packaging tolerances may be provided. In other words, in the packaged condition, the indicator 80 needs to be within the aperture without "winking," such that the relative size of the indicator 80 and aperture 82 facilitates control the desired packaging tolerances.

Figure 9:
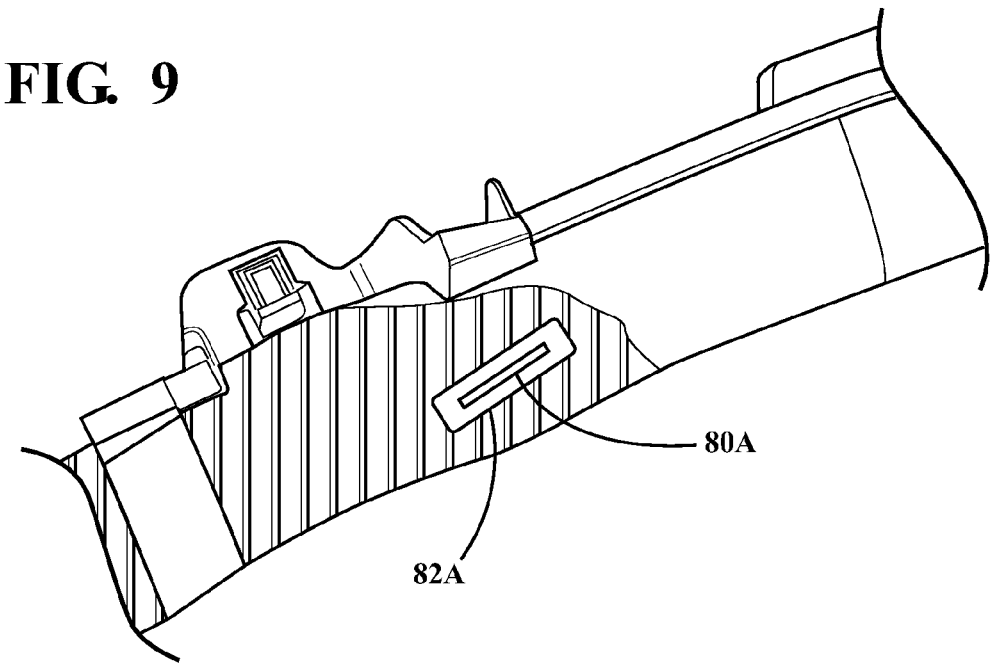
FIG. 9 is a view of the package confirmation quality check tool in another disclosed non-limiting embodiment.

With reference to FIG. 9, in another disclosed non-limiting embodiment, the indicator 80A is a woven line that is visible through a slot aperture 82A when the curtain shield airbag 38 is properly folded and rolled. It should be appreciated that the indicator 80A and the slot aperture 82A may be clocked or otherwise oriented to further confirm proper packaging.

The package confirmation quality check tool 84 can thereby readily confirm that the curtain shield airbag 38 is accurately folded and rolled into the packaged configuration.

It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An airbag system, comprising:
   an inflatable airbag including an aperture and an indicator, the aperture being provided on a first portion of the inflatable airbag, the indicator being provided on a second portion of the inflatable airbag,
   when the inflatable airbag is in a packaged condition, the first portion overlaps the second portion such that the indicator is viewable through the aperture from outside of the airbag.

2. The system as recited in claim 1, wherein the aperture is round.

3. The system as recited in claim 2, wherein the indicator is round.

4. The system as recited in claim 2, wherein the indicator is a dot.

5. The system as recited in claim 1, wherein the indicator is different color the inflatable airbag.

6. The system as recited in claim 1, wherein the aperture is a slot.

7. The system as recited in claim 6, wherein the indicator is a line.

8. The system as recited in claim 1, wherein the inflatable airbag is folded when in the packaged condition.

9. The system as recited in claim 1, wherein the inflatable airbag is rolled when in the packaged condition.

10. The system as recited in claim 1, wherein the inflatable airbag is folded and rolled when in the packaged condition.

11. The system as recited in claim 1, wherein the inflatable airbag is a curtain shield airbag that is generally rectilinear.

12. The system as recited in claim 11, wherein a corner of the inflatable airbag is folded when in the packaged condition.

13. The system as recited in claim 12, wherein the inflatable airbag is rolled after the corner is folded when in the packaged condition.

14. A method of packaging an inflatable airbag, the inflatable airbag including an indicator and an aperture, the aperture being provided on a first portion of the inflatable airbag, the indicator being provided on a second portion of the inflatable airbag, the method comprising:

rolling the inflatable airbag into a packaged condition in which the first portion overlaps the second portion; and confirming the indicator is visible through the aperture when the inflatable airbag is in the packaged condition.

15. The method as recited in claim 14, wherein the aperture is round.

16. The method as recited in claim 15, wherein the indicator is round.

17. The method as recited in claim 15, wherein the indicator is a dot.

18. The method as recited in claim 14, wherein the aperture is a slot.

19. The method as recited in claim 18, wherein the indicator is a line.

20. A method of packaging an inflatable airbag, the inflatable airbag including an indicator and an aperture, the method comprising:

rolling the inflatable airbag into a packaged condition;

confirming the indicator is visible through the aperture when the inflatable airbag is in the packaged condition; and folding a corner of the inflatable airbag prior to rolling.

* * * * *